(12) United States Patent
Schultz et al.

(10) Patent No.: US 10,007,117 B2
(45) Date of Patent: Jun. 26, 2018

(54) IMAGING LIGHT GUIDE WITH REFLECTIVE TURNING ARRAY

(71) Applicant: Vuzix Corporation, Rochester, NY (US)

(72) Inventors: Robert J. Schultz, Farmington, NY (US); Paul J. Travers, Honeoye Falls, NY (US)

(73) Assignee: Vuzix Corporation, West Henrietta, NY (US)

( * ) Notice: Subject to any disclaimer, the term of this patent is extended or adjusted under 35 U.S.C. 154(b) by 108 days.

(21) Appl. No.: 14/850,694

(22) Filed: Sep. 10, 2015

(65) Prior Publication Data

US 2017/0075119 A1    Mar. 16, 2017

(51) Int. Cl.
*G02B 27/01* (2006.01)
*G02B 5/09* (2006.01)
(Continued)

(52) U.S. Cl.
CPC ........... *G02B 27/0172* (2013.01); *G02B 5/09* (2013.01); *G02B 6/00* (2013.01); *G02B 27/0081* (2013.01); *G02B 27/141* (2013.01); *G02B 27/2228* (2013.01); *G02B 27/2235* (2013.01); *G02B 27/4205* (2013.01); *G02B 27/4272* (2013.01); *H04N 13/044* (2013.01); *G02B 2027/0123* (2013.01); *G02B 2027/0134* (2013.01)

(58) Field of Classification Search
CPC .... G02B 27/00; G02B 27/01; G02B 27/0179; G02B 27/017; G02B 27/0172; G02B 27/02; G02B 2027/0181; G02B 2027/0178; G02B 2027/0198; G02B 2027/0194
See application file for complete search history.

(56) References Cited

U.S. PATENT DOCUMENTS 6,829,095 B2  12/2004  Amitai
6,891,865 B1   5/2005  Ma
(Continued)

FOREIGN PATENT DOCUMENTS

WO    2014188149 A1   11/2014

OTHER PUBLICATIONS

Christodoulou et. al., "Scattering from stacked gratings and dielectrics for various angles of wave inceidence", Oct. 1988, IEEE transactions on antennas and propagation, vol. 36, No. 10.*
(Continued)

*Primary Examiner* — Robert E Tallman
(74) *Attorney, Agent, or Firm* — Thomas B. Ryan; Harter Secrest & Emery LLP

(57) ABSTRACT

An imaging light guide has a waveguide and an in-coupling diffractive optic formed on the waveguide and disposed to direct image-bearing light beams into the waveguide. An array of two or more at least partially reflective surfaces are oriented in parallel and disposed to expand the image-bearing light beams from the in-coupling diffractive optic in a first dimension and to direct the expanded image-bearing light beams toward an out-coupling diffractive optic. The out-coupling diffractive optic is formed on the waveguide and disposed to expand the image-bearing light beams in a second dimension orthogonal to the first dimension and to direct the image-bearing light beams toward a viewer eyebox.

22 Claims, 12 Drawing Sheets

(51) Int. Cl.
*G02B 27/14* (2006.01)
*G02B 27/22* (2018.01)
*G02B 27/42* (2006.01)
*H04N 13/04* (2006.01)
*G02B 27/00* (2006.01)
*G02B 6/00* (2006.01)

(56) References Cited

U.S. PATENT DOCUMENTS

| | | |
|---|---|---|
| 7,181,108 B2 | 2/2007 | Levola |
| 7,457,040 B2 | 11/2008 | Amitai |
| 7,613,373 B1 | 11/2009 | DeJong |
| 7,643,214 B2 | 1/2010 | Amitai |
| 7,724,442 B2 * | 5/2010 | Amitai ................ G02B 6/0056 359/630 |
| 7,778,508 B2 | 8/2010 | Hirayama |
| 7,839,575 B2 | 11/2010 | DeJong et al. |
| 7,949,214 B2 | 5/2011 | DeJong |
| 8,059,342 B2 | 11/2011 | Burke |
| 8,433,172 B2 | 4/2013 | Pascal et al. |
| 8,548,290 B2 | 10/2013 | Travers et al. |
| 8,873,150 B2 | 10/2014 | Amitai |
| 2006/0132914 A1 * | 6/2006 | Weiss ...................... G02B 5/32 359/462 |
| 2007/0091445 A1 | 4/2007 | Amitai |
| 2007/0188837 A1 * | 8/2007 | Shimizu ................ G02B 5/203 359/13 |
| 2009/0303599 A1 * | 12/2009 | Levola .............. G02B 27/0081 359/567 |
| 2014/0300966 A1 | 10/2014 | Travers et al. |

OTHER PUBLICATIONS

Stenzel, "Resonant reflection and absorption in grating waveguide structures", Integrated Optics: Devices, material and Technologies VIII, Procedings of SPIE, vol. 5355.*

Kim et. al. , Holographic optical elements recorded in silver halide sensitized gelatin emulsions. part 2. reflection holographic optical elements, applied optics, vol. 41, No. 8, pp. 1522-1533.*

International Search Report and Written Opinion dated Nov. 30, 2016 from corresponding International Application No. PCT/US2016/051138.

Shechter et al., "Compact beam expander with linear gratings," Applied Optics, vol. 41, No. 7, pp. 1236-1240, Mar. 1, 2002.

* cited by examiner

IMAGING LIGHT GUIDE WITH REFLECTIVE TURNING ARRAY

TECHNICAL FIELD

This invention generally relates to electronic displays and more particularly relates to head-mounted (near-eye) displays that use imaging light guides to convey image-bearing light to a viewer.

BACKGROUND OF THE INVENTION

Head-Mounted Displays (HMDs) are being developed for a range of diverse uses, including military, commercial, industrial, fire-fighting, and entertainment applications. For many of these applications, there is particular value in forming a virtual image that can be visually superimposed over the real-world image that lies in the field of view of the HMD user. Optical imaging light guides convey image-bearing light to a viewer in a narrow space for directing the virtual image to the viewer's pupil and enabling this superposition function.

In such conventional imaging light guides, collimated, relatively angularly encoded light beams from an image source are coupled into a planar waveguide by an input coupling such as an in-coupling diffractive optic, which can be mounted or formed on a surface of the planar waveguide or buried within the waveguide. Such diffractive optics can be formed as diffraction gratings, holographic optical elements or in other known ways. For example, the diffraction grating can be formed by surface relief. After propagating along the waveguide, the diffracted light can be directed back out of the waveguide by a similar output grating, which can be arranged to provide pupil expansion along one dimension of the virtual image. In addition, a turning grating can be positioned along the waveguide between the input and output gratings to provide pupil expansion in an orthogonal dimension of the virtual image. The image-bearing light output from the waveguide provides an expanded eyebox for the viewer.

Although conventional imaging light guide arrangements have provided significant reductions in bulk, weight, and overall cost of near-eye display optics, overall efficiency of the gratings is often limited by optical losses occurring at each grating interface. Since each grating area can only be fully optimized for one specific field angle and for one specific wavelength, performance across the field of view of the virtual image or across the visual spectrum of the same virtual image can vary greatly. This is true also of the turning grating that directs light that is traveling from the in-coupling to the out-coupling diffractive optics. Because an appreciable amount of input light energy is lost as the light encounters each diffractive optic, the input image source must be bright enough to compensate for lost brightness in the virtual image presented to the viewer.

Thus, it can be appreciated that there is a need for improved designs of image bearing light guides that still provide the desired pupil expansion, but provide enhanced efficiently in head-mounted displays.

In considering a light guide design used for imaging it should be noted that image-bearing light traveling within a waveguide is effectively encoded by the input coupling, whether the coupling mechanism uses gratings, holograms, prisms, mirrors, or some other mechanism. Any reflection, refraction, and/or diffraction of light that takes place at the input must be correspondingly decoded by the output in order to re-form the virtual image that is presented to the viewer.

A turning grating, placed in an intermediate position between the in-coupling and out-coupling diffractive optics, is typically chosen so that it does not induce any change on the encoded light. Preferably, the turning gratings redirect ray bundles within the waveguide, but do not change the encoded angular information of the virtual image. The resulting virtual image in such a designed system is not rotated. Further, if such a system did introduce rotation to the virtual image, it would do so non-uniformly across different field angles and wavelengths of light, thus causing unwanted distortions or aberrations in the resulting virtual image.

U.S. Pat. No. 6,829,095 by Amitai entitled "Substrate-Guided Optical Beam Expander" discloses input and output couplings in the form of mirrors that reflect sets of image bearing light beams into and out of a planar waveguide. The output coupling is divided into an array of reflective surfaces for expanding the exit pupil along one dimension. An intermediate array of reflective surfaces, referred to herein as a turning mirror, provides for expanding the exit pupil in an orthogonal dimension. The various input, output, and intermediate reflective surfaces are matched to each other to preserve the desired angular orientations of the image bearing beams.

One-dimensional (1-D) pupil-expansion guides of the type Amitai describes, however, have proved to be costly and difficult to fabricate. Extending this concept to 2-D beam expansion, using an array of mirrors oriented at a second set of angles, greatly complicates fabrication tasks that are already formidable and introduces alignment requirements that would be extremely difficult to satisfy.

Thus, both the turning gratings and the turning mirrors have been matched and oriented to work with similar types of input and output couplings, i.e., gratings with gratings and mirrors with mirrors. However, if a turning grating were used to redirect light that has been input using a mirror or a prism, this would produce unwanted effects in the resultant virtual image. As one consideration, with any type of reflective surface used in imaging, there can be unwanted reversal/rotation of the in-coupled light.

From the perspective of manufacturability, the use of diffractive optics to input and output the image-bearing light beams into and out of the waveguide can simplify a number of optical design problems. There is still, however, a need for an optical solution that allows better performance, increased efficiency, and compact packaging arrangements for redirecting light within a planar waveguide from the input couplings to the output couplings.

SUMMARY OF INVENTION

It is an object of the present disclosure to advance the art of image presentation within compact head-mounted (near-eye) displays. Advantageously, embodiments of the present disclosure provide a wearable display with an imaging light guide that offers an enlarged pupil size for presenting high resolution wide field of view (FOV) content to the viewer.

Imaging apparatus in embodiments of the present disclosure uses (a) diffraction to direct light into and out from a planar waveguide while providing pupil expansion along one dimension of a virtual image and (b) reflection within the waveguide for light redirection and pupil expansion along a second dimension of the virtual image.

This novel arrangement offers advantages in increased optical efficiency and brightness and allows more compact HMD and related display design options, since the arrangement provides both image rotation and reversal when compared against fully diffractive solutions.

These and other aspects, objects, features and advantages of the present invention will be more clearly understood and appreciated from a review of the following detailed description of the preferred embodiments and appended claims, and by reference to the accompanying drawings.

According to an aspect of the present disclosure, there is provided an imaging light guide that includes a waveguide, an in-coupling diffractive optic, an array of two or more at least partially reflective surfaces oriented in parallel to each other, and an out-coupling diffractive optic. The in-coupling diffractive optic directs a plurality of light beams, each representing a pixel of a virtual image, into the waveguide. The array of two or more at least partially reflective surfaces expands the image-bearing light beams from the in-coupling diffractive optic in a first dimension and directs the expanded image-bearing light beams toward the out-coupling diffractive optic. The out-coupling diffractive optic expands the image-bearing light beams in a second dimension and directs the image-bearing light beams from the waveguide toward a viewer eyebox.

BRIEF DESCRIPTION OF THE DRAWING FIGURES

DETAILED DESCRIPTION OF THE INVENTION

Figure 1:
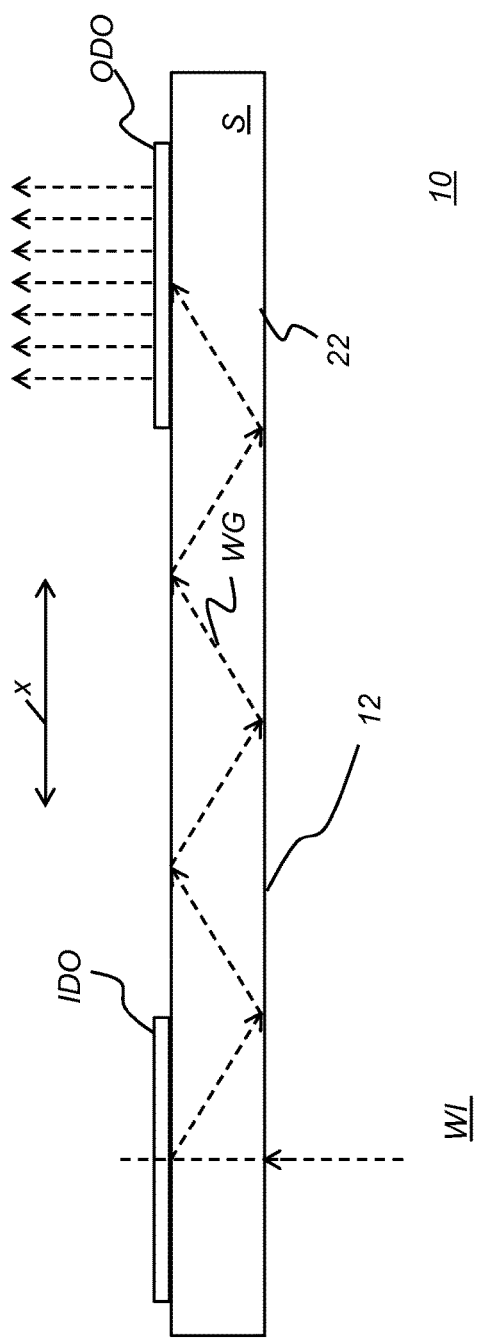
FIG. 1 is a schematic diagram showing a simplified cross-sectional view of one possible configuration of a monocular type diffractive beam expander.

The present description is directed in particular to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise.

In the context of the present disclosure, the terms "viewer", "operator", "observer", and "user" are considered to be equivalent and refer to the person who wears the HMD viewing device.

As used herein, the term "energizable" relates to a device or set of components that perform an indicated function upon receiving power and, optionally, upon receiving an enabling signal.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the term "oblique" means at an angle that is not an integer multiple of 90 degrees. Two lines, linear structures, or planes, for example, are considered to be oblique with respect to each other if they diverge from or converge toward each other at an angle that is at least about 5 degrees or more away from parallel, or at least about 5 degrees or more away from orthogonal.

In the context of the present disclosure, "reflectivity" is expressed as a percentage based on a ratio of the intensity of light reflected from the surface to the light incident upon the surface over the considered spectrum.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. Virtual image display has a number of inherent advantages for augmented reality display. For example, the apparent size of a virtual image is not limited by the size or location of a display surface. In comparison with systems that project a real image, a more realistic viewing experience can be provided by forming a virtual image that appears to be some distance away. Providing a virtual image also obviates any need to compensate for screen artifacts, as may be necessary when projecting a real image.

Unlike previous waveguide implementations that use diffraction for directing light internal to the imaging light guide that provides the virtual image display to the viewer, imaging light guide embodiments of the present disclosure use reflection rather than diffraction for redirecting diffracted light within the waveguide and for expanding the pupil in one direction. This arrangement can result in improved efficiency and brightness and relaxed constraints on the orientation of the image source for the imaging light guide.

FIG. 1 is a diagram showing a simplified cross-sectional view of one possible configuration of a monocular type diffractive beam expander or exit pupil expander 10 formed as an imaging light guide 22 comprising an input coupling, such as an in-coupling diffractive optic IDO, and an output coupling, such as an out-coupling diffractive optic ODO, arranged on a transparent and planar waveguide also referred to as an imaging light guide substrate S and alternately termed a pupil expander substrate S. In this example, the in-coupling diffractive optic IDO is shown as a reflective type diffractive optic arranged on an upper surface of the pupil expander substrate S. However, in-coupling diffractive optic IDO could alternately be a transmissive diffractive optic, arranged on a lower surface 12 of the pupil expander substrate S, where the in-coming light beam WI first interacts with the pupil expander substrate S. The diffractive optic can be formed on, in, attached, adjacent or otherwise optically coupled to the waveguide and can be formed as a diffraction grating, a volume hologram or other holographic patterned element, or other type of optical component with a ruling or other periodic array that diffracts the incoming, image-bearing light into or out of the waveguide. The volume holograms can be formed of alternating materials of variable index such as holographic polymer dispersed liquid crystal (HPDLC).

When used as a part of a virtual display system, in-coupling diffractive optic IDO couples the exemplary on-axis, in-coming light beam WI from an imager, via suitable front end optics (not shown), into the substrate S of imaging light guide 22. The input light beam WI is diffracted by in-coupling diffractive optic IDO. A portion of the first order diffracted light forms a guided light beam WG that propagates along the substrate S, moving toward the right in the FIG. 1 system, toward out-coupling diffractive optic ODO. Between gratings or other types of diffractive optics, the light beam WG is channeled or directed through the imaging light guide by Total Internal Reflection (TIR). Out-coupling diffractive optic ODO contributes to beam expansion, along the x-axis in the view of FIG. 1, and couples the light that it receives through substrate S, directing the light beam as a series of relatively displaced beamlets outwards, towards the observer.

Figure 2:
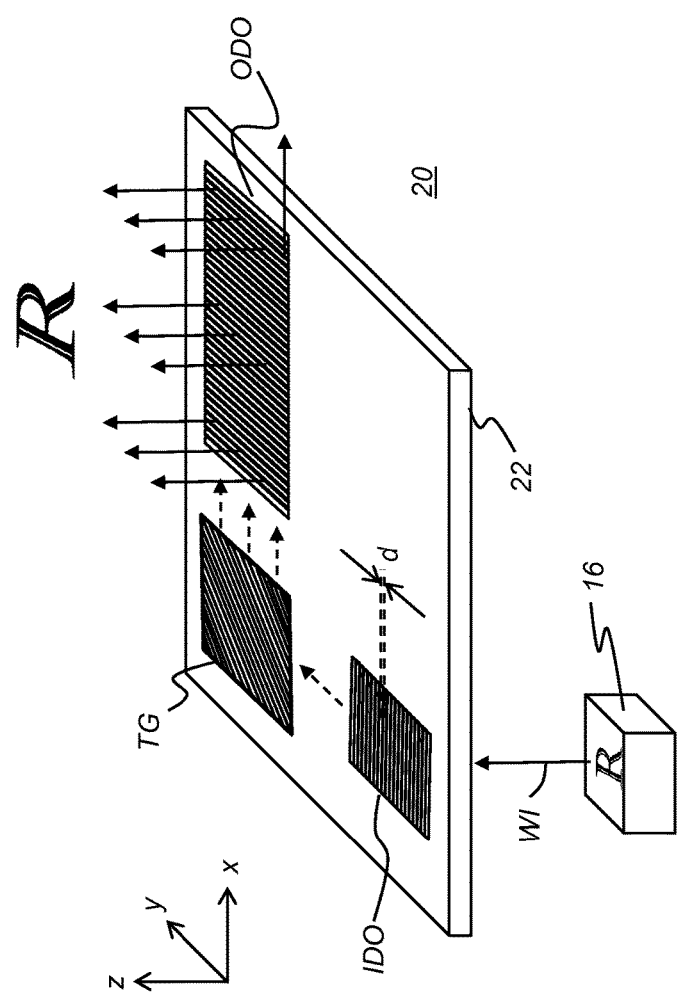
FIG. 2 is a perspective view showing a diffractive beam expander with a turning grating.

The perspective view of FIG. 2 shows a conventional beam expander 20 that is configured as an imaging light guide and that provides beam expansion along x- and y-axes of the intended image using an intermediate turning grating TG to redirect the light output (first diffracted mode) from in-coupling diffractive optic IDO to out-coupling diffractive optic ODO. In the FIG. 2 device, in-coupling diffractive optic IDO containing periodic rulings with a period d, receives incoming input optical beam WI representing one of a plurality of pixel generated by an image source 16. A full range of angularly encoded beams for producing a virtual image can be generated by a real display together with focusing optics, by a beam scanner for more directly setting the angles of the beams, or by a combination such as a one-dimensional real display used with a scanner. Beam expander 20 provides an expanded output beam from out-coupling diffractive optic ODO by using intermediate grating TG. Intermediate grating TG provides beam expansion in the y-axis direction and has an angular orientation of diffractive optics and a spacing geometry determined by spacing period d periodicity and the difference in angle of the diffraction features between diffractive optic IDO and diffractive optic ODO.

The use of turning grating TG provides an inherent geometrical accuracy to the design of beam expander 20 so that the input beams and output beams are symmetrically oriented with respect to each other. Image symmetry is shown for an image of the letter 'R' in FIG. 2. It should be noted that the image that is formed for the imaging light guide viewer is a virtual image, focused at infinity, but with the relative orientation of output image content to input image content as represented in FIG. 2. A similar pattern for showing relative image orientation using letter 'R' is followed in subsequent figures. A change in the rotation about the z axis or angular orientation of incoming light beam WI with respect to the x-y plane causes a corresponding symmetric change in rotation or angular orientation of outgoing light from out-coupling diffractive optic ODO. From the aspect of image orientation, turning grating TG simply acts as a type of optical relay, providing beam expansion along one axis of the image that is input at in-coupling diffractive optic IDO and output at out-coupling diffractive optic ODO. Turning grating TG is typically a slanted or square grating or, alternately, can be a blazed grating.

The conventional imaging light guide beam expander 20 that is shown in FIGS. 1 and 2 is used in a number of existing head-mounted device (HMD) designs for providing image content to a viewer. This type of beam expander is particularly well-suited to augmented reality applications in which image content can be superimposed on a real-world view as seen through the transparent imaging light guide. However, there are some performance limitations and dimensional/angular constraints that relate to the use of turning grating TG.

Angular performance of the turning gratings can be limiting. The turning gratings, when designed correctly, can at best be an ideal solution for a single field angle and at a single wavelength. The efficiency curve for the reflective refractive order that actually redirects the light has similar characteristics to those for the in-coupling and out-coupling diffractive optics. A ray of the design wavelength and at a central field angle propagating through the system is efficiently in-coupled (diffractive optic IDO), efficiently turned and expanded in one dimension (grating TG), and efficiently out-coupled and expanded in the orthogonal dimension (diffractive optic ODO). A similar ray of the same wavelength, but from an extreme field point, would conversely be less efficiently coupled in, less efficiently turned, and less efficiently coupled out. This leads to difficulty in balancing performance, color balance, and brightness across the full angular field.

Conventional hand-held projection devices, such as pico-projectors for example, typically provide image content with a 9:16 height-to-width aspect ratio. Angular range limitations of the conventional imaging light guide design, in turn, constrain the allowed orientation of projector devices, typically preventing compact packaging of picoprojector devices in an HMD, for example. As a further constraint, overall light efficiency is limited, as was noted previously.

Embodiments of the present disclosure provide an optical system for forming a virtual image with an enlarged view pupil or eyebox. The optical system includes an imaging light guide in the form of a single planar waveguide component that has (i) an in-coupling element, such as an in-coupling diffractive optic IDO, for accepting incident image-bearing light beams and directing at least the first order diffracted light from the incident light beams along the planar component using TIR; (ii) an out-coupling element, such as an out-coupling diffractive optic ODO, for expanding the respective image-bearing light beams in a first direction transverse to the direction of beam propagation and directing the image-bearing light beams outward to form the virtual image; and (iii) a reflector array having at least first and second parallel reflective surfaces, differing from each other in reflectivity, that expand the respective image-bearing light beams in a second direction transverse to the direction of beam propagation and orthogonal to the first direction and are disposed at an angle that directs the diffracted light from the in-coupling diffractive optic toward the out-coupling diffractive optic for forming the virtual image. Where diffractive optics are used, the in-coupling and out-coupling diffractive optics IDO and ODO, respectively, preferably have the same diffraction period.

Figure 3:
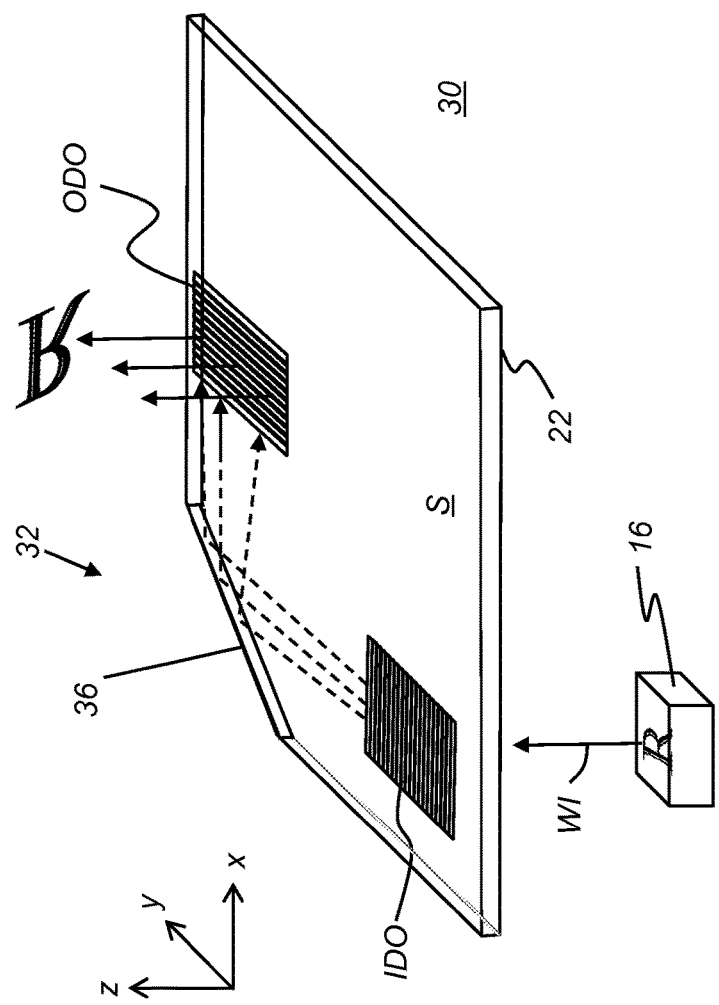
FIG. 3 is a perspective view showing a hybrid beam expander for expansion in a single direction, using in-coupling and out-coupling diffractive optics and a reflector for turning the beams, according to an embodiment of the present disclosure.

To help boost the overall efficiency of an imaging light guide beam expander, embodiments of the present disclosure use one or more reflective surfaces encased within, appended to, or otherwise formed as a part of the beam expander substrate to perform the turning and beam expanding function with respect to the y axis. As a first exemplary embodiment, FIG. 3 shows a beam expander 30 on a waveguide substrate S that uses a reflector 36 for turning the output beams. Reflector 36 is formed within or along an outer edge of beam expander 30, disposed at an appropriate angle for the grating vectors in the direction of the periodicity of the in-coupling and out-coupling diffractive optics IDO and ODO, respectively. According to an embodiment of the present disclosure, reflector 36 reflects light that is parallel to the grating vector of in-coupling diffractive optic IDO so that the reflected light is, in turn, parallel to the grating vector of out-coupling diffractive optic ODO. Dashed lines show light paths for the diffracted first order light within the imaging light guide. As the dashed lines indicate, reflector 36 changes the orientation of the virtual image, effectively reversing the virtual image content and rotating the image at twice the incident angle of the central field chief ray at the reflector, as shown by the letter 'R' in this figure. As noted, pupil expansion is effected in one direction only in the FIG. 3 arrangement using the out-coupling diffractive optic ODO.

Figure 4:
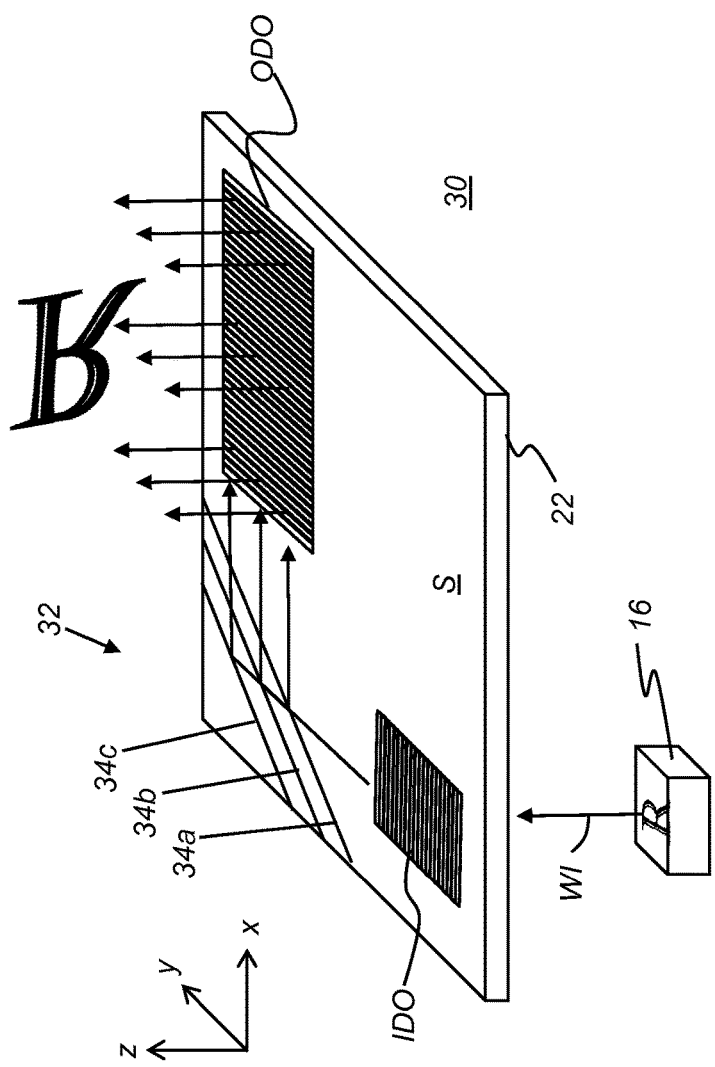
FIG. 4 is a perspective view showing a hybrid 2-D beam expander that uses in-coupling and out-coupling diffractive optics and an array of reflectors for turning the beams, according to an embodiment of the present disclosure.

FIG. 4 is a perspective view that shows a beam expander 30 according to an embodiment of the present disclosure. Beam expander 30 has in-coupling and out-coupling diffractive optics IDO and ODO respectively, as described with reference to FIGS. 2 and 3 and uses a reflector array 32 for 2-dimensional (2-D) beam expansion. An arrangement of this type expands the light beam output in the x and y directions. Reflector array 32 has three specularly reflective surfaces, shown in the FIG. 4 embodiment as reflectors 34a, 34b, and 34c. Some of the specularly reflective surfaces in the array are partially reflective, so that some of the light incident on reflector 34a is transmitted through to reflector 34b; similarly, some of the light incident on reflector 34b is transmitted through to reflector 34c. Reflectivity increases for successive reflectors in the array as the reflectors are further separated from the in-coupling or out-coupling diffractive optics IDO, ODO. The last or rearmost reflector in the series, reflector 34c in the example of FIG. 4, generally has a nominal reflectance of 100%.

In order to provide a uniform distribution of the light in the expanded pupil, the successive reflectors 34a, 34b, and 34c of reflector array 32 can have different amounts of reflectivity or, conversely, different amounts of transmittance. Exemplary values for a 5-reflector embodiment, with no absorption, are given in the following table.

TABLE

Exemplary Reflectivity for 5-Reflector Array

| Reflector | Reflectivity | Transmissivity |
|---|---|---|
| 1 | 12% | 88% |
| 2 | 16% | 84% |
| 3 | 23% | 77% |
| 4 | 38% | 62% |
| 5 | 100% | — |

Figure 5A:
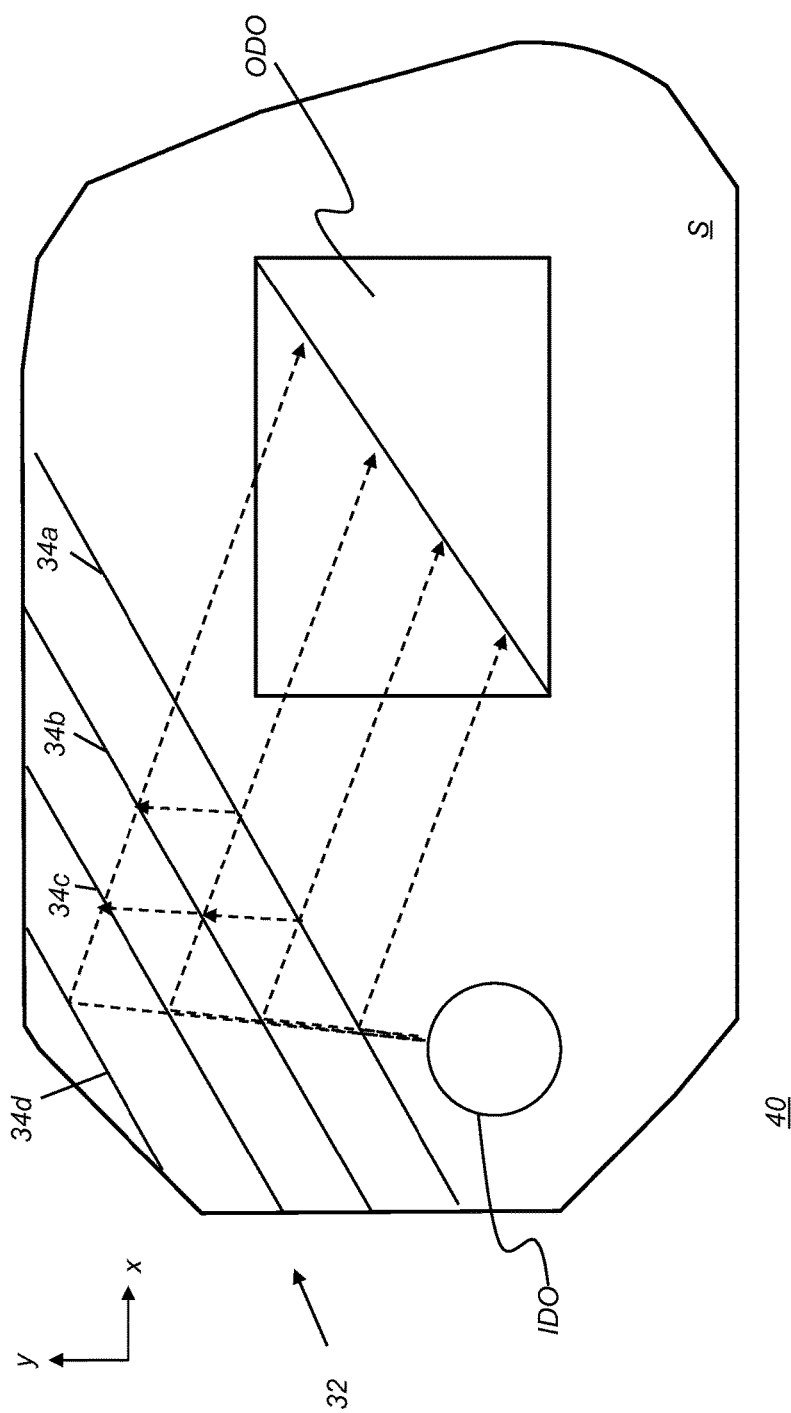
FIG. 5A is a plan view showing an imaging light guide that provides a beam expander using a reflector array.

FIG. 5A is a plan view of a beam expander 40 that traces the axial light paths for central field points from in-coupling diffractive optic IDO to out-coupling diffractive optic ODO when using reflector array 32. In the example of FIG. 5A, reflector array 32 has four reflective surfaces, shown as reflectors 34a, 34b, 34c, and 34d.

With respect to the embodiment of FIG. 5A, beam expansion takes place not only due to the reflections of light transmitted to the reflectors 34a, 34b, 34c, and 34d, but also because portions of the reflected light are further reflected by the reflectors 34a, 34b, 34c, and 34d. Thus, the same light can encounter the same individual reflectors 34a, 34b, 34c, and 34d multiple times under conditions of transmission or reflection. Some of this multiple reflection is shown. As is suggested in FIG. 5A, reflectors 34a, 34b, and 34c are reflective on both sides, so that diminishing portions of the light propagate between each combination of parallel reflective surfaces. The reflectivity designated for each of the respective surfaces accounts for these additional reflections. It can also be noted that there will be some inevitable losses due to absorption as well as due to light propagation beyond the reflectors themselves or the target output grating area.

Figure 5B:
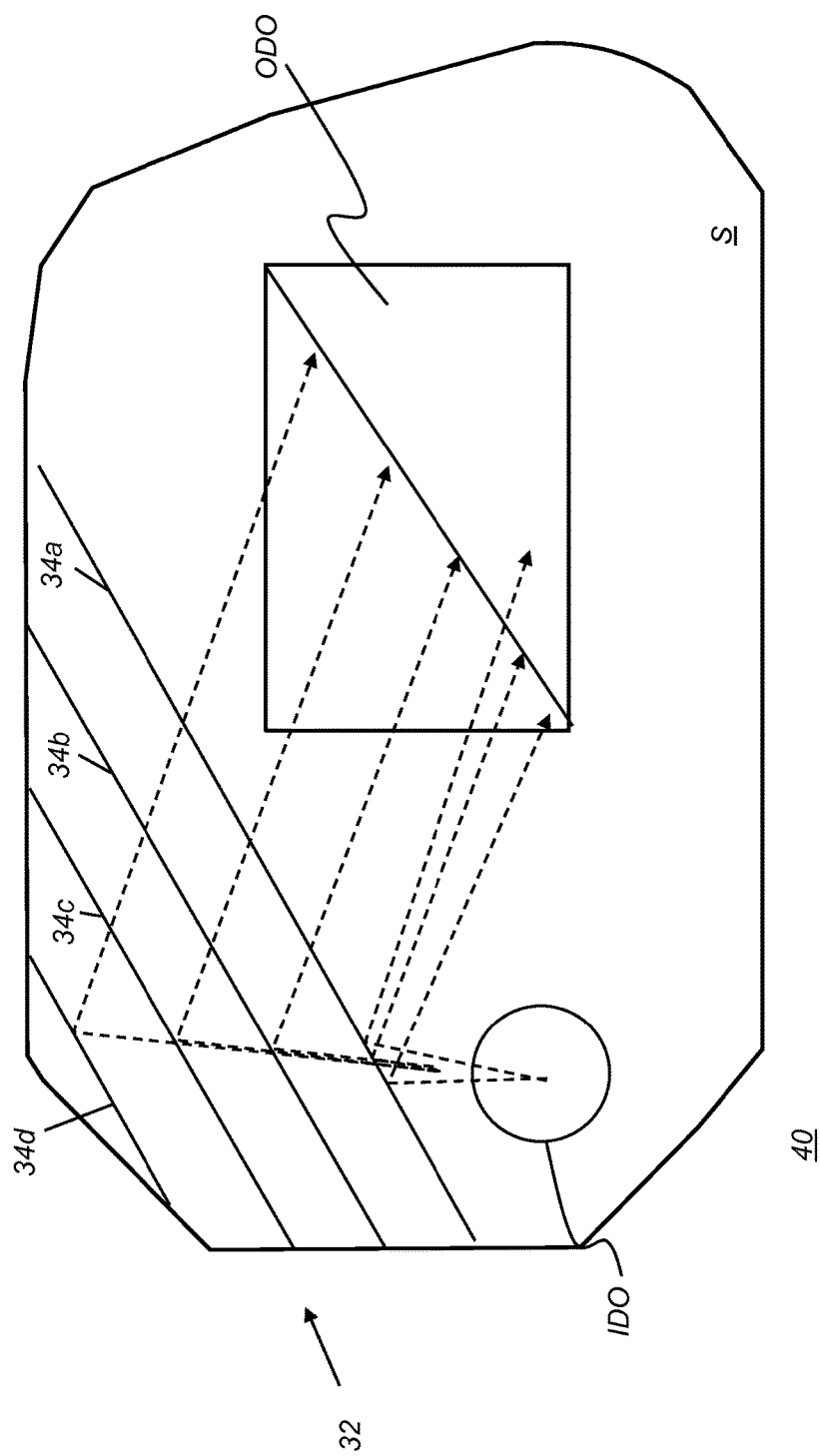
FIG. 5B is a plan view showing an imaging light guide that provides a beam expander using a reflector array and also showing an expanded portion of the field points of the incident image.

The spacing between the reflective surfaces of reflectors 34a, 34b, 34c, and 34d is another consideration for maintaining the desired intensity profile throughout each of the expanded beams. For example, one would not want to split an individual (pixel) beam into beamlets that are deflected beyond a region of proximate overlap with adjacent beamlets to avoid gaps or brightness variations in the image viewable within the eyebox. Proper reflectivity and spacing between reflective surfaces can also produce a desired distribution of energy across the expanded individual (pixel) beam composed of the multiple beamlets. In general, the distance between reflector surfaces should not exceed about 2.5 times the thickness of the guide substrate S FIG. 5B is a plan view of beam expander 40 that is modified to show redirection of field points spaced away from the central field point, with light at normal incidence. The same angular incidence of the light applies for each of reflectors 34a, 34b, 34c, and 34d.

Figure 6A:
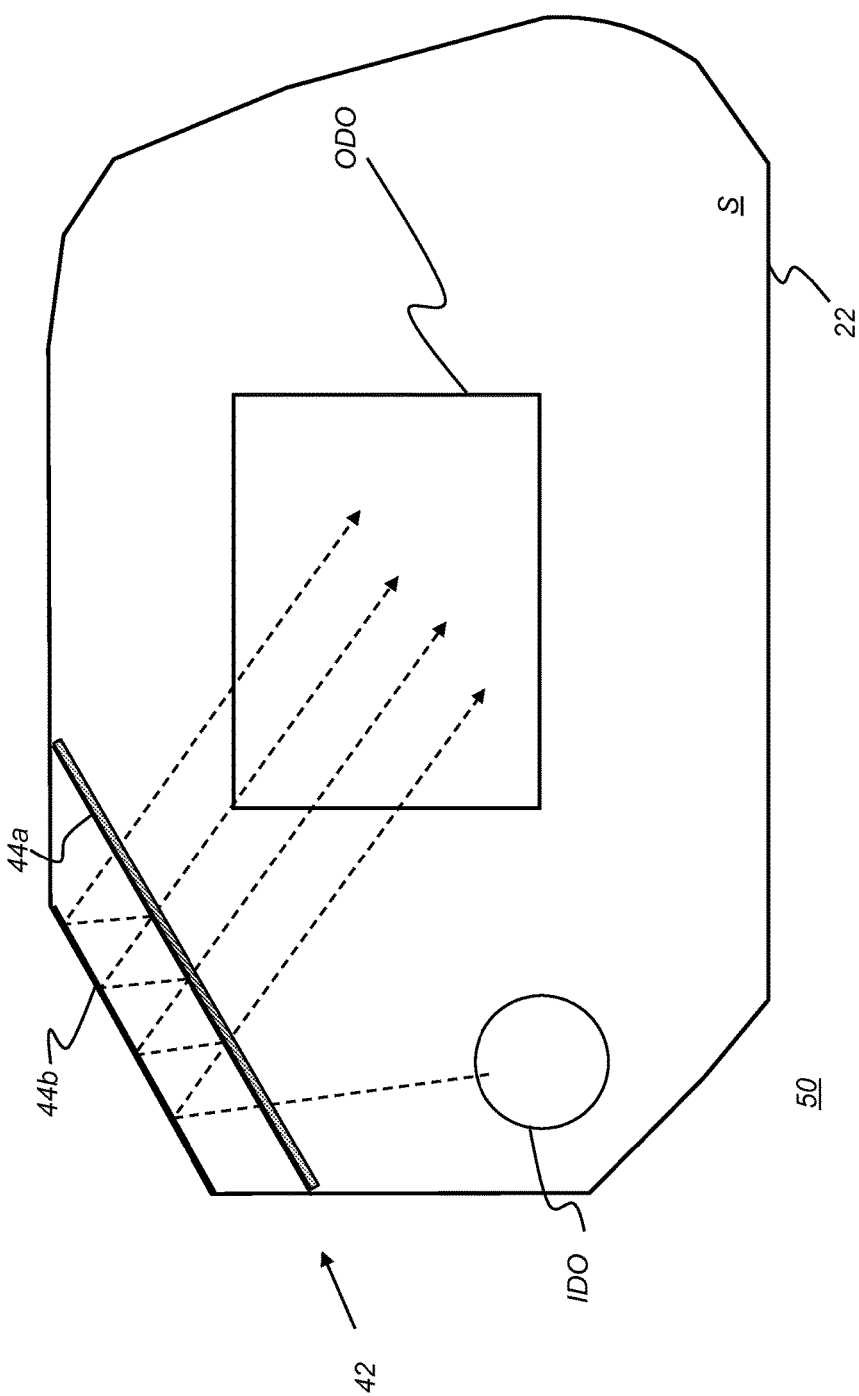
FIG. 6A is a plan view showing an imaging light guide that employs a gradient reflector array.

FIG. 6A shows an alternate embodiment of a beam expander 50 using imaging light guide 22 that provides variable amounts of reflectance using only two reflectors 44a and 44b in a box arrangement provided by a gradient reflector array 42. Reflector 44b is a standard mirror with a nominal reflectance for visible light of 100%. Reflector 44a has a gradient coating with varying reflectance along its length, distributing reflected light internal to reflector array 42 in order to provide beam expansion. The phrase "gradient reflectivity" indicates that the reflectivity value changes progressively, preferably in a continuously increasing or decreasing manner, but can also include more incremental changes in reflectivity as may be preferable for purposes of manufacture or optical performance. According to an embodiment of the present disclosure, the gradient reflectivity over a length portion of the reflector 44a continuously changes monotonically over a range from less than 10% reflectivity to greater than 50% reflectivity. Other ranges can also be provided.

Figure 6B:
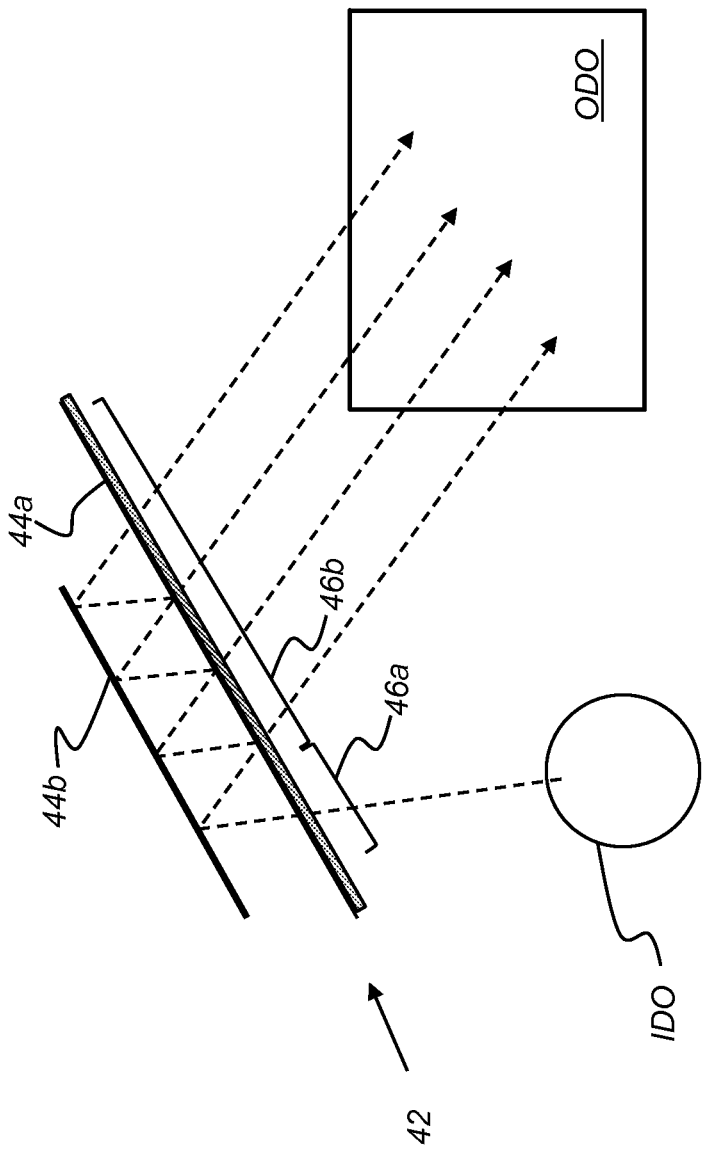
FIG. 6B is a schematic view showing how a gradient reflector array operates.

FIG. 6B is a schematic view, selectively omitting some of the imaging light guide 22 detail of FIG. 6A for clarity, showing how gradient reflector array 42 operates, repeatedly reflecting the light from in-coupling diffractive optic IDO with variably transmissive regions arranged in succession. Diffracted light output from in-coupling diffractive optic IDO initially passes through a fully transmissive region 46a of reflector 44a and is reflected by reflector 44b, which directs the light back toward reflector 44a. A partially transmissive region 46b of reflector 44a is coated to provide a reflective gradient, by way of example, ranging from 75% reflective to less than 50% reflective along the length of reflector 44a. The light that is transmitted through reflector 44a is directed outward toward out-coupling diffractive optic ODO. Reflector 44b reflects the incident light that had been reflected from region 46b back toward partially transmissive region 46b, over a segment of reflector 44a that is less reflective, such as 66% reflective in this example. Over the portion of reflector 44a that is 66% reflective, about ⅓ of incident light is then transmitted to another portion of out-coupling diffractive optic ODO. A diminishing amount of light is repeatedly reflected back and forth between reflectors 44a and 44b until a final remnant of the image-bearing light from in-coupling diffractive optic IDO is transmitted to diffractive optic ODO through gradient reflector 44a.

Figure 6C:
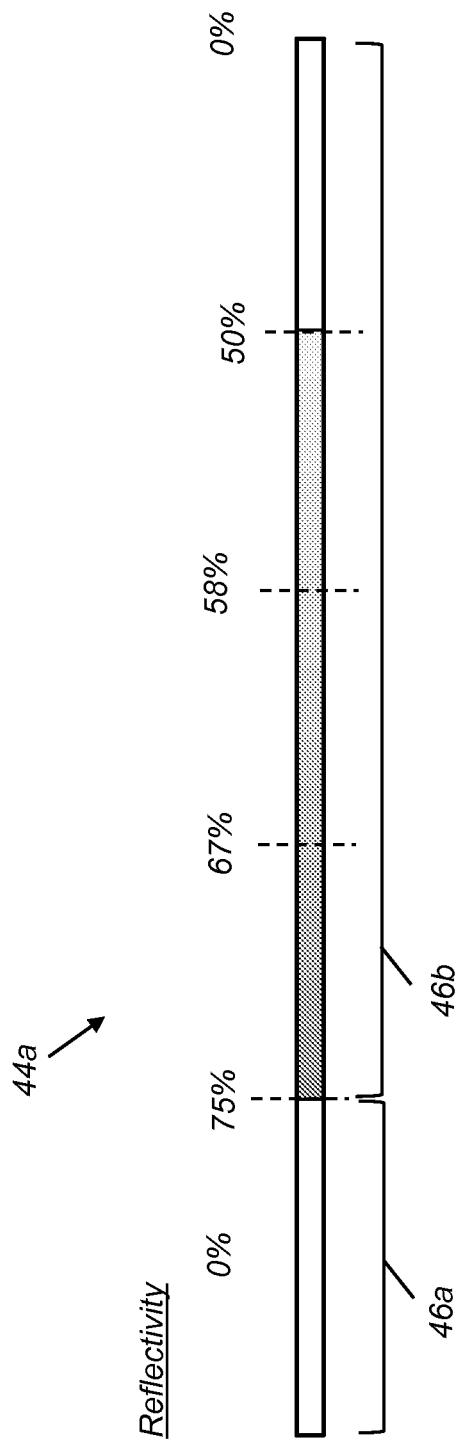
FIG. 6C is a plan view showing exemplary regions of a gradient reflector.
Figure 6D:
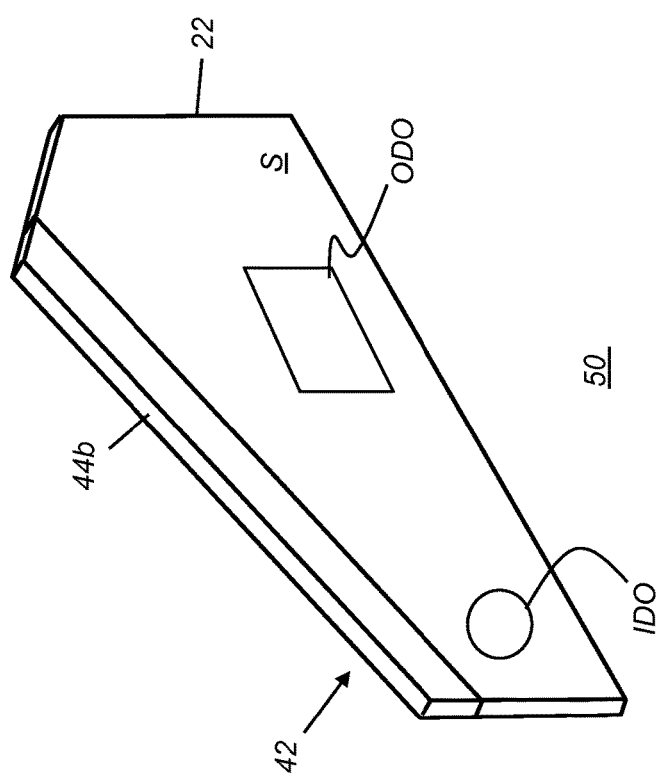
FIG. 6D is a perspective view showing a beam expander having a gradient reflector array.

One possible overall arrangement of regions 46a and 46b of gradient reflector 44a is shown in side view in FIG. 6C. Dashed lines indicate local values of reflectivity along gradient reflector 44a. FIG. 6D shows beam expander 50 in a perspective view. Reflector 44b is formed along an edge of imaging light guide 22 in the example shown. It can be readily appreciated that reflectivity values given herein for the FIG. 6A-6D examples illustrate the general principle for varying the reflectivity of gradient reflector 44a but are not to be considered restrictive. The reflectivity values that are actually used in any embodiment can depend on various factors including amount of light loss, coatings tolerances, and other performance variables. Subregions having uniform reflectivity values, changing along the length of reflector 44a, could alternatively be provided.

The gradient reflectivity of reflector array 42 can provide an additional freedom sensitive to inclination angle. While simply expanding the individual (pixel) beams helps to expand the eyebox, the typical eyebox remains much smaller than the size of the individual expanded beams because the expanded beams do not fully intersect at the eyebox. In order to more fully intersect at the eyebox, the individual beams, which propagate in different directions, must exit from different positions within the output grating. To improve the chances of intersection (i.e., overlap) in one dimension, certain angle beams can be directed more toward one side of the output grating than the other. To cause this, the gradient reflective surface can be made selectively more reflective to light of certain angles of incidence over other angles of incidence so that the different angles are directed toward different sides of the output grating. Using this method is complicated by the individual (pixel) beams being angularly encoded in two dimensions. Thus, the reflective sensitivity should be limited to just one of the dimensions.

For best performance, the beam expander optics would provide each individual (pixel) beam with its own transverse distribution of energy so that most of the energy reaches the eyebox and non-overlapping portions of the beams contain less energy. The reflective surfaces of arrays 32 and 42 construct the output individual (pixel) beams as individual collections of relatively offset beamlets, where each beamlet can vary in both intensity and position. Embodiments of the present disclosure allow the reflective intermediate beam expander to direct light toward out-coupling diffractive optic ODO through a range of angles spanning at least 90 degrees. The light can approach out-coupling diffractive optic ODO along either orthogonal axis of the image or somewhere in-between, such as at an oblique angle as shown in FIG. 5A. The capability for direction at an oblique angle can be advantageous for component positioning and packaging. In addition, the reflector arrays 32, 42 can provide for interconnecting the central field rays between the in-coupling and out-coupling diffractive optics IDO, ODO at oblique angles while maintaining alignment with one of the orthogonal axes x, y of the image, particularly at the out-coupling diffractive optic.

Figure 7:
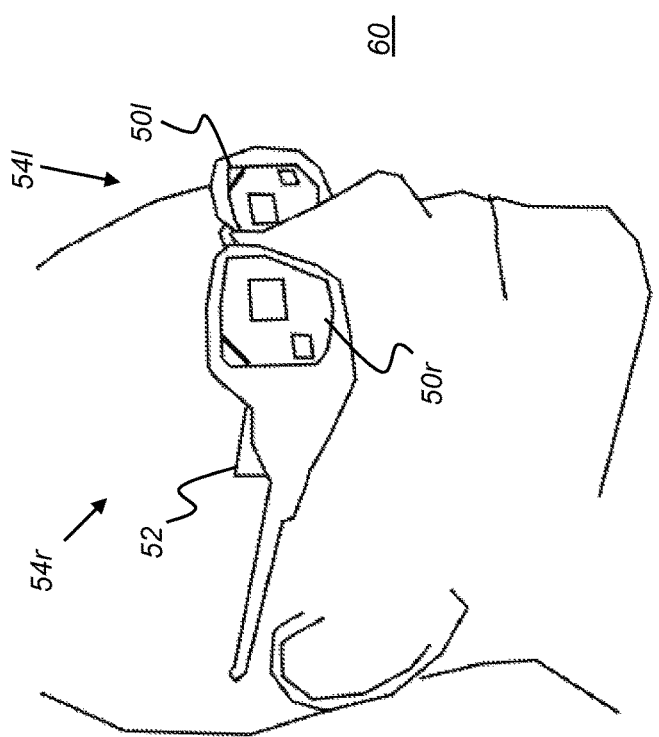
FIG. 7 is a perspective view showing a display system for augmented reality viewing using imaging light guides of the present disclosure.

The perspective view of FIG. 7 shows a display system 60 for three-dimensional (3-D) augmented reality viewing using imaging light guides of the present disclosure. Display system 60 is shown as an HMD with a left-eye optical system 54l having a beam expander 50l for the left eye and a corresponding right-eye optical system 54r having a beam expander 50r for the right eye. An image source 52, such as a picoprojector or similar device, can be provided, energizable to generate a separate image for each eye, formed as a virtual image with the needed image orientation for upright image display, as described previously. The images that are generated can be a stereoscopic pair of images for 3-D viewing. The virtual image that is formed by the optical system can appear to be superimposed or overlaid onto the real-world scene content seen by the viewer. Additional components familiar to those skilled in the augmented reality visualization arts, such as one or more cameras mounted on the frame of the HMD for viewing scene content or viewer gaze tracking, can also be provided.

Figure 8:
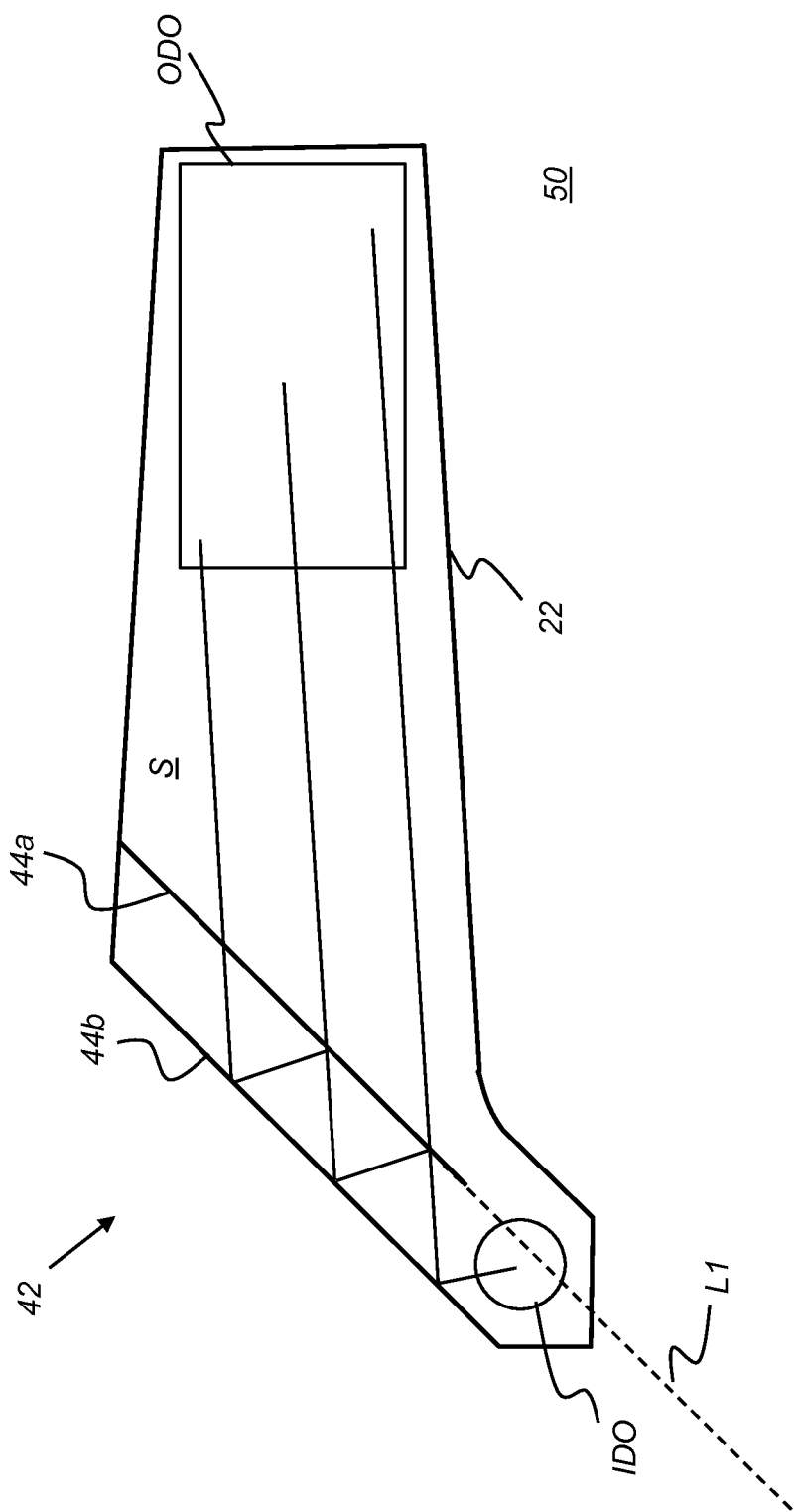
FIG. 8 is a schematic view showing an alternate embodiment of the present disclosure using a gradient reflector array.

The plan view of FIG. 8 shows an alternative embodiment of imaging light guide 22 using gradient reflector array 42. With this arrangement, in-coupling diffractive optic IDO is positioned more closely toward 100% reflective reflector 44b than in other embodiments and is in line with gradient reflective reflector 44a; a line L1 coincident with gradient reflective reflector 44a intersects in-coupling diffractive optic IDO. Reflectors 44a and 44b are at 45 degrees to the k vector or grating vector, which extends in the direction of periodicity, for in-coupling diffractive optic IDO.

Embodiments described herein use diffractive optics for in-coupling and out-coupling functions, and used for conventional waveguides. It must be noted that input and output coupling can use mechanisms other than diffraction, such as reflection, for example, for directing angularly encoded beams into and out from the imaging waveguide and providing the desired beam expansion.

Beam Expander Fabrication

Reflectors that form the reflector array 32 or gradient reflector array 42 can be formed using dichroic coatings, metalized coatings, or a combination of dichroic and metalized coatings. In pupil expander devices, methods for forming reflector array 32 can include coating individual pieces of glass or other transparent substrate, then piecing together these portions to form the beam expander in sections.

The imaging light guides are preferably manufactured in lots. The parallel surfaces (perpendicular to the outer surfaces of the imaging light guide) can be cut and polished first. The blocks can be the thickness of multiple imaging light guides, which can then be coated and assembled, ideally, using index-matched adhesive. This assembly process can be performed under an autocollimator or with a retro-reflected spot to maintain proper alignment. Angular alignment precision can be on the order of % of the angular spread of one virtual image pixel. Achieving even finer resolution could require more accurate manufacturing practices.

The block of aligned surfaces can be diced in a direction perpendicular to these surfaces to define the outer surfaces of the imaging light guides. Each block of glass can then be polished as a high quality flat under a double planetary polisher to form a blank. The polished blank preferably has better than one arc minute of parallelism.

The final outer shape of the imaging light guide can be cut from a blank in an appropriate manner.

After proper surface preparation of the glass imaging light guide blank, the diffractive optics can be formed on one or both outer surfaces of the imaging light guide using nano-imprinting methods, for example.

The same methods described herein apply to embodiments that use multiple partially reflective surface systems as shown by example in FIG. 4 and gradient reflector systems and shown in FIG. 6A, with differences in the specified coatings and in the number of surfaces that require alignment.

The imaging light guide can be formed with a flat substrate such as an optical glass, as described with reference to an embodiment of the present disclosure. For example, embodiments of the present disclosure provide an imaging light guide formed in a flat waveguide and having an in-coupling diffractive optic formed on the substrate that is disposed to form first-order diffracted light from each incident light beam representing a pixel of the virtual image and an array of two or more reflective surfaces disposed in parallel along or within the substrate and wherein at least one of the two or more reflective surfaces lies in the path of first-order diffracted light formed from the in-coupling diffractive optic. The two or more reflective surfaces are disposed at an angle that directs the first-order diffracted light formed from the in-coupling diffractive optic towards an out-coupling diffractive optic that is disposed to direct light outward from the imaging light guide. The out-coupling diffractive optic and the in-coupling diffractive optic preferably have the same grating period and each of the two or more reflective surfaces has a different reflectivity.

The invention has been described in detail with particular reference to presently preferred embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An imaging light guide for conveying a virtual image comprising:
    a waveguide having front and back surfaces;
    an in-coupling diffractive optic disposed on one of the front and back surfaces to direct image-bearing light beams of a virtual image into the waveguide for propagation in a first direction along the waveguide;
    a reflector array of two or more at least partially reflective surfaces oriented in parallel and disposed to expand the respective image-bearing light beams from the in-coupling diffractive optic in a first dimension and to direct the expanded image-bearing light beams in a second different direction along the waveguide toward an out-coupling diffractive optic using reflection rather than diffraction to expand and direct the image-bearing light beams along the waveguide toward the out-coupling diffractive optic; and
    the out-coupling diffractive optic being disposed on one of the front and back surfaces to expand the respective image-bearing light beams from the reflector array in a second dimension orthogonal to the first dimension and to direct the two-dimensionally expanded image-bearing light beams from the waveguide toward a viewer eyebox,
    wherein the two or more at least partially reflective surfaces are each specularly reflective and oriented for rotating the virtual image that is directed from the waveguide toward the viewer eyebox.

2. The imaging light guide of claim 1 wherein the two or more at least partially reflective surfaces of the reflector array comprise a first of the two or more at least partially reflective surfaces and a second of the two or more at least partially reflective surfaces, wherein
    the first of the two or more at least partially reflective surfaces is partially reflective and partially transmissive, and
    the second of the two or more at least partially reflective surfaces is fully reflective.

3. The imaging light guide of claim 2 wherein the first of the two or more at least partially reflective surfaces has a length and reflectivity values that vary along at least a portion of the length.

4. The imaging light guide of claim 3 wherein the reflectivity values of the first of the two or more at least partially reflective surfaces vary monotonically along the length from less than 10% reflectivity to greater than 50% reflectivity.

5. The imaging light guide of claim 1 wherein at least one of the in-coupling and out-coupling diffractive optics is a diffraction grating.

6. The imaging light guide of claim 1 wherein at least one of the in-coupling and out-coupling diffractive optics is a volume hologram or formed from a holographic polymer dispersed liquid crystal.

7. The imaging light guide of claim 1 wherein one or more of the two or more at least partially reflective surfaces is formed using dichroic coatings.

8. The imaging light guide of claim 2 wherein the two or more at least partially reflective surfaces of the reflector array further comprise a third of the two or more at least partially reflective surfaces, wherein
    the third of the two or more at least partially reflective surfaces is disposed between the first and second of the two or more at least partially reflective surfaces,
    the third of the two or more at least partially reflective surfaces is partially reflective and partially transmissive, and
    the third of the two or more at least partially reflective surfaces has a reflectivity value that is greater than a reflectivity value of the first of the two or more at least partially reflective surfaces.

9. The imaging light guide of claim 1 wherein the waveguide includes an edge that extends between the front and back surfaces, and one of the two or more at least partially reflective surfaces lies along the edge of the waveguide, and wherein the at least partially reflective surface that lies along the edge is a mirror.

10. The imaging light guide of claim 1 wherein the out-coupling diffractive optic and the in-coupling diffractive optic have the same grating period.

11. The imaging light guide of claim 1 wherein the reflector array is relatively positioned for reflecting central field rays of the virtual image between the in-coupling diffractive optic and the out-coupling diffractive optic through an oblique angle.

12. An imaging light guide formed in a flat substrate having front and back surfaces for conveying a virtual image and comprising:

a) an in-coupling diffractive optic formed on one of the front and back surfaces of the substrate and disposed to diffract incident image-bearing light beams of the virtual image for propagation in a first direction along the substrate;

b) an out-coupling diffractive optic formed on one of the front and back surfaces of the substrate and disposed to direct the image-bearing light beams outward from the substrate, and c) first and second at least partially reflective surfaces being oriented in parallel and disposed along or within the substrate to expand the respective image-bearing light beams from the in-coupling diffractive optic in a first dimension and to direct the expanded image-bearing light in a second different direction along the substrate toward the out-coupling diffractive optic using reflection rather than diffraction to expand and direct the image-bearing light beams along the substrate toward the out-coupling diffractive optic, wherein the two or more at least partially reflective surfaces are each specularly reflective and oriented for rotating the virtual image that is directed from the substrate, the first at least partially reflective surface is partially reflective and partially transmissive, the second at least partially reflective surface is more fully reflective, and the first partially reflective and partially transmissive surface is arranged (a) to reflect portions of the image-bearing light beams reflected by the second more fully reflective surface back toward the second more fully reflective surface and (b) to transmit portions of the image-bearing light beams reflected by the second more fully reflective surface toward the out-coupling diffractive optic.

13. The imaging light guide of claim 12 wherein the first partially reflective and partially transmissive surface has a length and reflectivity values that vary along at least a portion of the length.

14. The imaging light guide of claim 13 wherein the different reflectivity values of the first partially reflective and partially transmissive surface range over a gradient from less than 10% reflectivity to greater than 50% reflectivity.

15. The imaging light guide of claim 12 wherein the first and second at least partially reflective surfaces are relatively positioned for reflecting central field rays of the virtual image between the in-coupling diffractive optic and the out-coupling diffractive optic through an oblique angle.

16. The imaging light guide of claim 12 wherein the out-coupling diffractive optic and the in-coupling diffractive optic have the same grating period.

17. The imaging light guide of claim 12 in which the first and second at least partially reflective surfaces are spaced apart through a limited distance at which the second portions of the respective image bearing beams at least proximately overlap en route to the out-coupling diffractive optic.

18. A 3-D display apparatus for a viewer, the display apparatus comprising:

a left-eye optical system for forming a left-eye image and a right-eye optical system for forming a right-eye image, wherein each of the optical systems comprises:

a) an image source that is energizable to generate image-bearing light beams of a virtual image; and b) an imaging light guide comprising:

a waveguide having front and back surfaces;

an in-coupling diffractive optic formed on one of the front and back surfaces of the waveguide in the path of the image-bearing light beams from the image source and disposed to redirect the image-bearing light beams into the waveguide for propagation in a first direction along the waveguide;

a reflector array of two or more at least partially reflective surfaces oriented in parallel and disposed to expand the image-bearing light beams from the in-coupling diffractive optic in a first dimension and to direct the expanded image-bearing light beams in a second different direction along the waveguide toward an out-coupling diffractive optic using reflection rather than diffraction to expand and direct the image-bearing light beams along the waveguide toward the out-coupling diffractive optic; and the out-coupling diffractive optic being formed on one of the front and back surfaces of the waveguide and disposed to expand the image-bearing light beams in a second dimension orthogonal to the first dimension and to direct the two-dimensionally expanded image-bearing light beams of the virtual image toward a viewer eyebox, wherein the two or more at least partially reflective surfaces are each specularly reflective and oriented for rotating the virtual image that is directed from the waveguide.

19. The imaging light guide of claim 18 wherein the waveguide includes edges interconnecting the front and back surfaces and one of the two or more at least partially reflective surfaces lies along an edge of the waveguide, and wherein the at least partially reflective surface that lies along the edge is a mirror.

20. A method of making an imaging light guide comprising:

a) forming an in-coupling diffractive optic on a planar substrate, wherein the in-coupling diffractive optic has a first grating period and a first grating vector;

b) forming an out-coupling diffractive optic on the planar substrate, wherein the out-coupling diffractive optic has a second grating period equal to the first grating period and a second grating vector that is nonparallel to the first grating vector; and c) forming a reflector array along or within the planar substrate, wherein the step of forming the in-coupling diffractive optic includes arranging the in-coupling diffractive optic to diffract incident image-bearing light beams into the planar substrate for propagation in a first direction along the planar substrate toward the reflector array, wherein the step of forming the out-coupling diffractive optic includes arranging the out-coupling diffractive optic to diffract incident image-bearing light beams of the virtual image reflected from the reflector array out of the planar substrate, wherein the step of forming the reflector array includes orienting two or more at least partially reflective surfaces in parallel to expand the image-bearing light beams from the in-coupling diffractive optic in a first dimension and to direct the expanded image-bearing light beams in a second different direction along the planar substrate toward an out-coupling diffractive optic using reflection rather than diffraction to expand and direct the image-bearing light beams along the planar substrate toward the out-coupling diffractive optic, wherein each of the two or more at least partially reflective surfaces is formed having a different reflectivity, and wherein the two or more at least partially reflective surfaces are each specularly reflective and oriented for rotating the virtual image that is directed from the waveguide planar substrate.

21. The method of claim 20 in which the step of forming the out-coupling diffractive optic includes arranging the out-coupling diffractive optic to expand the image-bearing light beams from the reflector array in a second dimension orthogonal to the first dimension.

22. The method of claim 21 in which the steps of forming the in-coupling diffractive optic, the out-coupling diffractive optic and the reflector array include relatively positioning the reflector array for reflecting central field rays of the virtual image between the in-coupling diffractive optic and the out-coupling diffractive optic through an oblique angle.

* * * * *